United States Patent [19]

Ferleger et al.

[11] Patent Number: 5,354,178
[45] Date of Patent: Oct. 11, 1994

[54] LIGHT WEIGHT STEAM TURBINE BLADE

[75] Inventors: Jurek Ferleger, Longwood; Daniel R. Cornell, Winter Springs, both of Fla.

[73] Assignee: Westinghouse Electric Corporation, Pittsburgh, Pa.

[21] Appl. No.: 164,372

[22] Filed: Dec. 9, 1993

Related U.S. Application Data

[63] Continuation-in-part of Ser. No. 157,714, Nov. 24, 1993.

[51] Int. Cl.$^5$ ............................................. F01D 5/14
[52] U.S. Cl. ................................. 416/223 A; 416/242
[58] Field of Search ............. 416/223 A, 242, DIG. 2

[56] References Cited

U.S. PATENT DOCUMENTS

| | | |
|---|---|---|
| 2,934,259 | 4/1960 | Hausmann . |
| 3,333,817 | 8/1967 | Rhomberg ............................ 416/242 |
| 4,533,298 | 8/1985 | Partington et al. . |
| 4,626,174 | 12/1986 | Sato et al. ........................ 416/223 A |
| 4,695,228 | 9/1987 | Purcaru ............................ 416/223 A |
| 4,765,046 | 8/1988 | Partington et al. . |
| 4,824,328 | 4/1989 | Pisz et al. . |
| 4,900,230 | 2/1990 | Patel . |
| 4,919,593 | 4/1990 | Brown . |
| 5,035,578 | 7/1991 | Tran ................................. 416/223 A |
| 5,088,894 | 2/1992 | Patel . |
| 5,156,529 | 10/1992 | Ferleger et al. . |
| 5,192,190 | 3/1993 | Ferleger et al. . |
| 5,203,676 | 4/1993 | Ferleger et al. . |
| 5,211,703 | 5/1993 | Ferleger et al. . |
| 5,221,181 | 6/1993 | Ferleger et al. . |
| 5,277,549 | 1/1994 | Chen et al. ....................... 416/223 A |

*Primary Examiner*—Edward K. Look
*Assistant Examiner*—James A. Larson

[57] ABSTRACT

A steam turbine blade is provided in which the geometry of the blade airfoil is configured to reduce the weight of the blade while maintaining adequate thermodynamic performance. The blade has a high camber angle to increase its stiffness and an airfoil portion having pressure and suction surfaces. The curvature of the portion of the pressure surface between the base and 75% blade height has a point of inflection in an area adjacent the leading edge so that the curvature switches sign. The curvature upstream of the point of inflection is concave, while the curvature downstream of the point of inflection is convex.

7 Claims, 6 Drawing Sheets

LIGHT WEIGHT STEAM TURBINE BLADE

RELATED APPLICATIONS

This application is a continuation-in-part of application Ser. No. 08/157,714 filed Nov. 24, 1993, entitled "Light Weight Steam Turbine Blade" by J. Ferleger and D. Cornell, hereby incorporated by reference in its entirety.

BACKGROUND OF THE INVENTION

The present invention relates to blades for a steam turbine rotor. More specifically, the present invention relates to a light weight blade for use in the transition zone of a low pressure steam turbine that substantially reduces the centrifugal stress on the blade root and the rotor groove in which it is disposed.

The steam flow path of a steam turbine is formed by a stationary cylinder and a rotor. A large number of stationary vanes are attached to the cylinder in a circumferential array and extend inward into the steam flow path. Similarly, a large number of rotating blades are attached to the rotor in a circumferential array and extend outward into the steam flow path. The stationary vanes and rotating blades are arranged in alternating rows so that a row of vanes and the immediately downstream row of blades forms a stage. The vanes serve to direct the flow of steam so that it enters the downstream row of blades at the correct angle. The blade airfoils extract energy from the steam, thereby developing the power necessary to drive the rotor and the load attached to it.

The amount of energy extracted by each row of rotating blades depends on the size and shape of the blade airfoils, as well as the quantity of blades in the row. Thus, the shapes of the blade airfoils are an extremely important factor in the thermodynamic performance of the turbine and determining the geometry of the blade airfoils is a vital portion of the turbine design.

As the steam flows through the turbine its pressure drops through each succeeding stage until the desired discharge pressure is achieved. Thus, the steam properties—that is, temperature, pressure, velocity and moisture content—vary from row to row as the steam expands through the flow path. Consequently, each blade row employs blades having an airfoil shape that is optimized for the steam conditions associated with that row. However, within a given row the blade airfoil shapes are identical, except in certain turbines in which the airfoil shapes are varied among the blades within the row in order to vary the resonant frequencies.

Designing a steam turbine blade is made difficult by the fact that the airfoil shape determines, in large part, the mechanical strength of the blade and its resonant frequencies, as well as the thermodynamic performance of the blade. These considerations impose constraints on the choice of blade airfoil shape so that, of necessity, the optimum blade airfoil shape for a given row is a matter of compromise between its mechanical and aerodynamic properties.

This situation is exacerbated in the transition zone of a low pressure steam turbine, such as that used in a boiling water reactor nuclear power plant, due to the high moisture content of the steam flow in that zone. Such high moisture content results in erosion and corrosion of the components exposed to the steam flow. Most importantly, for present purposes, this erosion and corrosion can weaken the blade, especially in the root area, as well as the rotor groove to which the blade is secured. Since the blade root and rotor groove are subjected to high stresses due to centrifugal force, the erosion and corrosion can result in cracking.

Consequently, it is important that the weight of the blade be minimized, thereby minimizing the centrifugal force to which the blade root and rotor groove are subjected during operation.

It is therefore desirable to provide a row of steam turbine blades that achieve adequate performance using very light weight airfoils.

SUMMARY OF THE INVENTION

Accordingly, it is the general object of the current invention to provide a row of steam turbine blades that achieves adequate performance using airfoils of very light weight.

Briefly, this object, as well as other objects of the current invention, is accomplished in a steam turbine comprising a stationary cylinder for containing a steam flow, and a rotor enclosed by the cylinder and having a row of blades. Each of the blades has a root portion attached to the rotor and an airfoil portion. Each of the airfoil portions has (i) a base portion and a tip portion defining an airfoil height therebetween, (ii) a leading edge portion and a trailing edge portion, and (iii) pressure and suction surfaces extending between the leading edge and trailing edge portions and defining a thickness of the airfoil therebetween.

According to the present invention, each of the airfoils has first, second and third transverse sections disposed radially outward from the root by distances equal to approximately 25%, 50% and 75%, respectively, of the height of the airfoil. A first portion of the airfoil height extends between the first and third sections. The pressure surface over at least this first portion of the airfoil height having a curvature undergoing an inflection at a location thereon. A first portion of the pressure surface disposed upstream of the inflection location and a second portion of the pressure surface disposed downstream of the inflection location. The pressure surface having a convex curvature in the first portion and a concave curvature in the second portion.

DESCRIPTION OF THE PREFERRED EMBODIMENT

Figure 1:
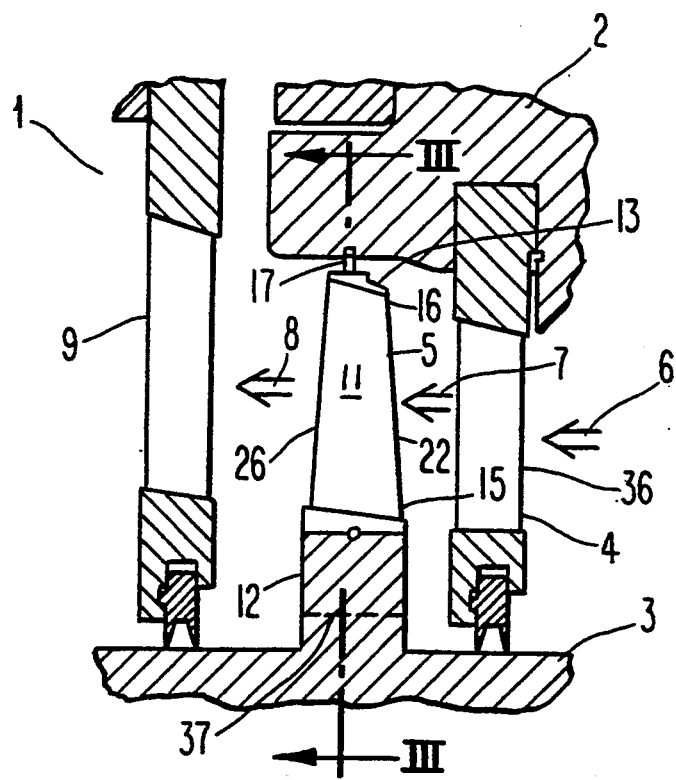
FIG. 1 is a portion of a cross-section through a steam turbine in the vicinity of the transition zone showing the blade according to the current invention, along with the adjacent vanes.

Referring to the drawings, there is shown in FIG. 1 a portion of a longitudinal cross-section through the low pressure section of a steam turbine 1 in the vicinity of the transition zone. As shown, the steam flow path of the steam turbine 1 is formed by a stationary cylinder 2 and a rotor 3. A row of blades 5 are attached to the periphery of the rotor 3 and extend radially outward into the flow path in a circumferential array. A row of vanes 4 of a diaphragm structure are attached to the cylinder 2 and extend radially inward in a circumferential array immediately upstream of the row of blades 5. As previously discussed, the vanes 4 have airfoils 36 that cause the steam 6 to undergo a portion of the stage pressure drop as it flows through the row of vanes. The vane airfoils 36 also serve to direct the flow of steam 6 entering the stage so that the steam 7 enters the row of blades 5 at the correct angle. A second row of vanes 9 is disposed immediately downstream of the blades 5 and serves to direct the flow of steam 8 exiting the stage to the correct angle for the following row of blades (not shown).

As shown in FIG. 1, each blade 5 is comprised of an airfoil portion 11 that extracts energy from the steam 7, a root portion 12 that serves to fix the blade to the rotor 3 via a groove 37 formed therein, and a shroud 13 that is integrally formed at the airfoil tip 16 (such an integral shroud is disclosed in U.S. Pat. No. 4,533,298 (Partington et al.), assigned to the same assignee as the current invention and herein incorporated by reference in its entirety). The integral shroud 13, in conjunction with a seal 17, serves to minimize the leakage of steam past the blade row. The airfoil 11 has a base portion 15 at its proximal end adjacent the root 12—that is, the base is the portion of the airfoil that forms an intersection with the root 12. The airfoil 11 also has a tip portion 16 at its distal end—that is, the tip is the portion of the airfoil that forms an intersection with the shroud 13.

Figure 6:
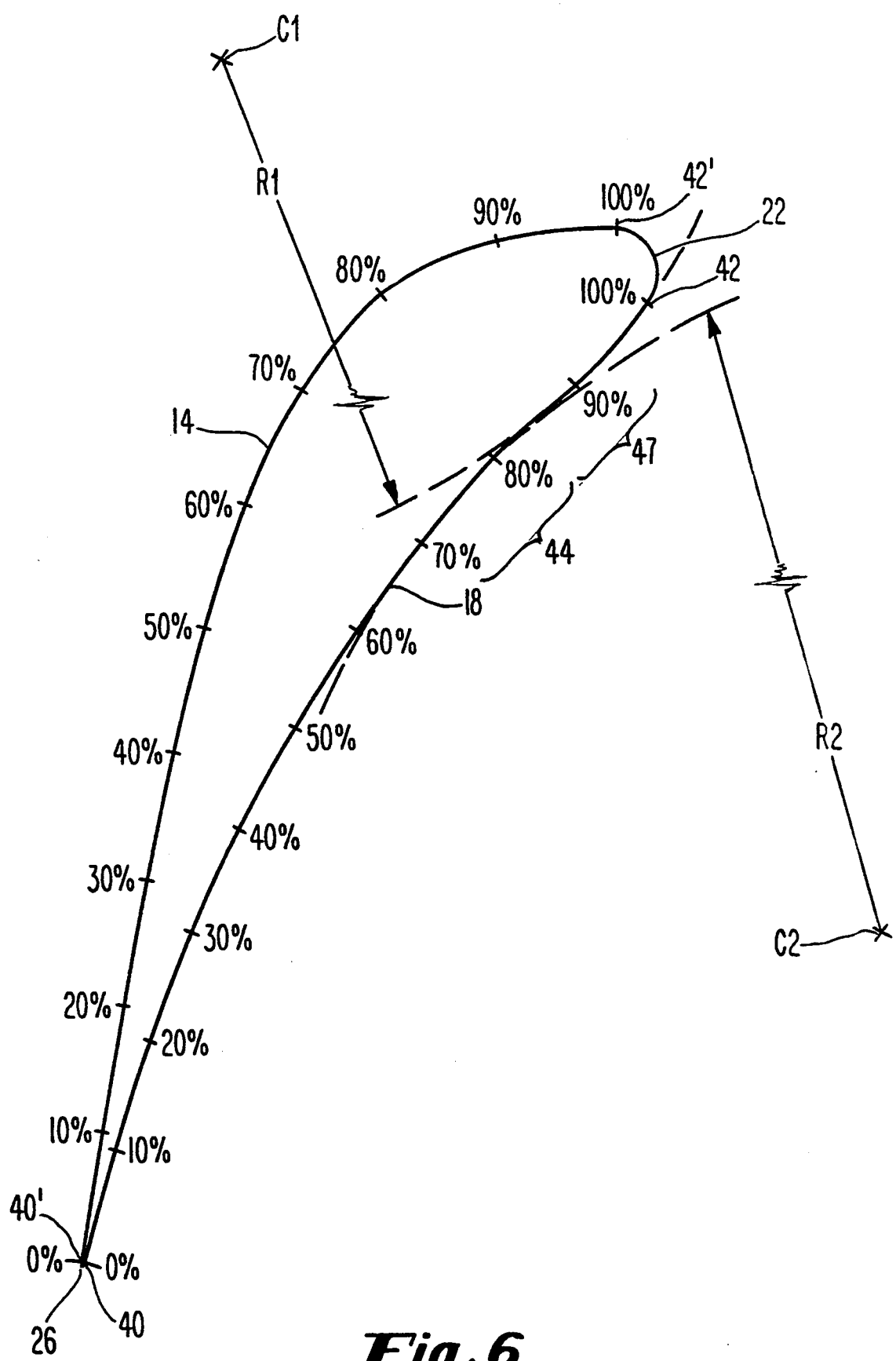
FIG. 6 is an enlarged view of the blade transverse cross-section at mid-height shown in FIG. 3.

The current invention concerns the airfoil 11 of the blade 5. More specifically, the current invention concerns a novel airfoil shape that greatly reduces the weight of the airfoil while maintaining adequate thermodynamic performance. As shown in FIG. 6, each airfoil has a leading edge portion 22, a trailing edge portion 26, a concave suction surface 14 and a pressure surface 18 that has both concave and convex portions, as discussed further below. (As used herein, the term "leading edge portion" refers to the radiused portion of the airfoil 11 that connects the pressure surface 18 with the suction surface 14 at the upstream edge of the airfoil—that is, the portion between locations 42 and 42' in FIG. 6. Similarly, the term "trailing edge portion" refers to the radiused portion of the airfoil 11 that connects the pressure surface 18 with the suction surface 14 at the downstream edge of the airfoil—that is, the portion between locations 40 and 40' in FIG. 6.) The novel geometry of the airfoil 11 for the blade of the current invention is specified in Tables I-IV by the relevant parameters, each of which is discussed below (all angles in Tables I and IA are expressed in degrees), and illustrated in FIGS. 4 and 6.

In Table I, each parameter is specified at three radial stations along the airfoil—specifically, (i) at 25% height, corresponding to a radius from the center line of the rotor 3 of 85.2 cm (33.5 in), (ii) at mid-height, corresponding to a radius of 87.8 cm (34.6 in), and (iii) at 75% height, corresponding to a radius of 90.4 cm (35.6 in). Note, as used herein, percent height is defined with reference to the radial distance between the extrapolated base and tip sections of the airfoil, as discussed below—that is, as a percentage of the distance from the base 15 of the airfoil 11 where its leading edge portion 22 intersects the root 12 to the tip 16 of the airfoil where its trailing edge portion 26 intersects the shroud.

TABLE I

| Airfoil Parameters | | | |
|---|---|---|---|
| Percent Height | 25% Section | 50% Section | 75% Section |
| Radius (cm) | 85.2 | 87.8 | 90.4 |
| Width (cm) | 3.6 | 3.2 | 2.9 |
| Pitch/Width Ratio | 1.20 | 1.39 | 1.59 |
| Pitch/Cord Ratio | 0.69 | 0.73 | 0.76 |
| Stagger Angle | 53.8 | 57.7 | 61.1 |
| Maximum Thickness (mm) | 13.6 | 10.4 | 7.8 |
| Max Thickness/Cord | 0.22 | 0.17 | 0.13 |
| Camber Angle | 67.9 | 53.7 | 42.4 |
| Exit Opening (mm) | 10.1 | 10.7 | 11.3 |
| Inlet Metal Angle | 97.9 | 112.4 | 123.8 |
| Inlet Included Angle | 67.3 | 52.1 | 33.8 |
| Suction Surface Turning Angle | 11.2 | 13.3 | 14.9 |

Figure 3:
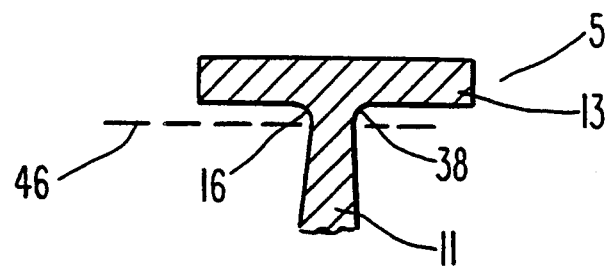
FIG. 3 is a cross-section taken along lines III—III shown in FIG. 1.

As shown in FIG. 1, both the tip 16 and the base of the airfoil 11 are inclined at an angle to the axial direction. Thus, a cross-section through the airfoil tip 16 and base 15 would also be inclined at an angle to the axial direction, rather than lying in a single plane parallel to the axis of the rotor 3. Moreover, as shown in FIG. 3, fillets 38 and 39 are formed at the intersections between the airfoil and the shroud 13 and between the airfoil and the root 12. These fillets distort the actual blade geometry in a manner that is, by and large, irrelevant to its thermodynamic performance. Therefore, for purposes of establishing an airfoil's geometry, blade designers typically consider the tip cross-section to be the cross-section of the airfoil, ignoring the fillet 38, extrapolated up to a plane parallel to the axis of the rotor 3 and located at the intersection of the trailing edge portion 26 and the shroud 13. The airfoil base cross-section is considered to be the cross-section of the airfoil, ignoring the fillet 39, extrapolated down to a plane parallel to the axis of the rotor 3 and located at the intersection of the leading edge 22 and the root 12.

Thus, to further define the airfoils parameters of the blade according to the current invention, Table IA shows the same parameters as in Table I at four additional radial stations. Two of these radial stations are in the base portion 15—specifically, (i) the airfoil cross-section, extrapolated to a plane oriented parallel to the axis of the rotor 3, located at the intersection between the leading edge 22 and the root 12 ("extrapolated base"), corresponding to a radius of 82.6 cm (32.5 in) and (ii) the location just above the fillet 39, indicated by line 45 in FIG. 3, corresponding to a radius of 83.5 cm (32.9 in). The remaining two radial stations are in the tip portion 16—specifically, (i) the location just below the fillet 38, indicated by line 46 in FIG. 3, corresponding to a radius of 91.6 cm (36.1 in) and (ii) the airfoil cross-section, extrapolated to a plane oriented parallel to the rotor axis, located at the intersection between the trailing edge portion 26 and the tip ("extrapolated tip"), corresponding to a radius of 93.0 cm (36.6 in).

TABLE IA

| Section Location | Airfoil Parameters | | | |
| --- | --- | --- | --- | --- |
| | Extrapolated Base | Above Fillet | Below Shroud | Extrapolated Tip |
| Radius (cm) | 82.6 | 83.5 | 91.6 | 93.0 |
| Width (cm) | 4.1 | 3.9 | 2.7 | 2.5 |
| Pitch/width Ratio | 1.03 | 1.09 | 1.71 | 1.85 |
| Pitch/Chord Ratio | 0.65 | 0.66 | 0.78 | 0.79 |
| Stagger Angle | 49.7 | 51.1 | 62.8 | 64.6 |
| Max Thickness (mm) | 18.1 | 16.4 | 6.7 | 5.4 |
| Max Thickness/Chord | 0.28 | 0.28 | 1.1 | 0.09 |
| Camber Angle | 81.6 | 76.8 | 39.5 | 36.2 |
| Exit opening (mm) | 9.6 | 9.8 | 11.6 | 11.9 |
| Inlet Metal Angle | 84.1 | 89.1 | 127.1 | 131.0 |
| Inlet Included Angle | 78.9 | 73.7 | 28.1 | 21.8 |
| Suction Surface Turning Angle | 9.3 | 9.8 | 16.1 | 16.8 |

Figure 4:
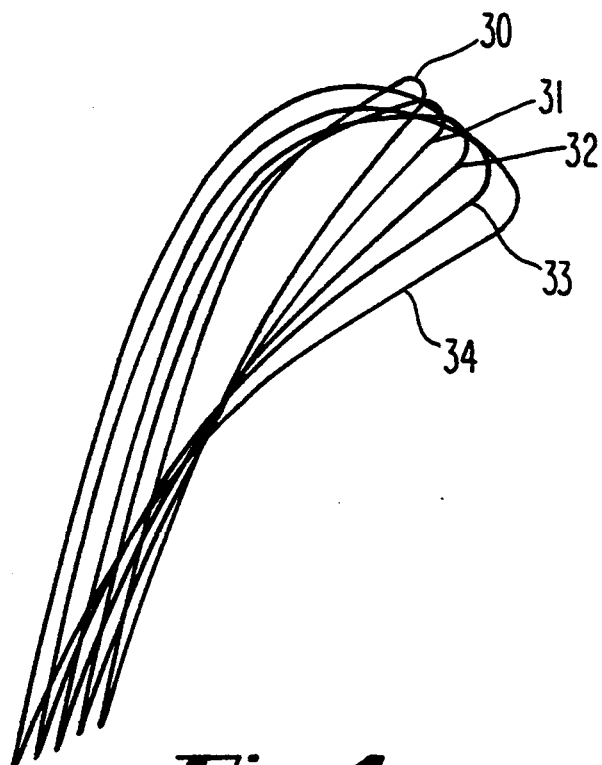
FIG. 4 is a stacked plot of transverse cross-sections through the blade shown in FIG. 1 at various radial locations.
Figure 2:
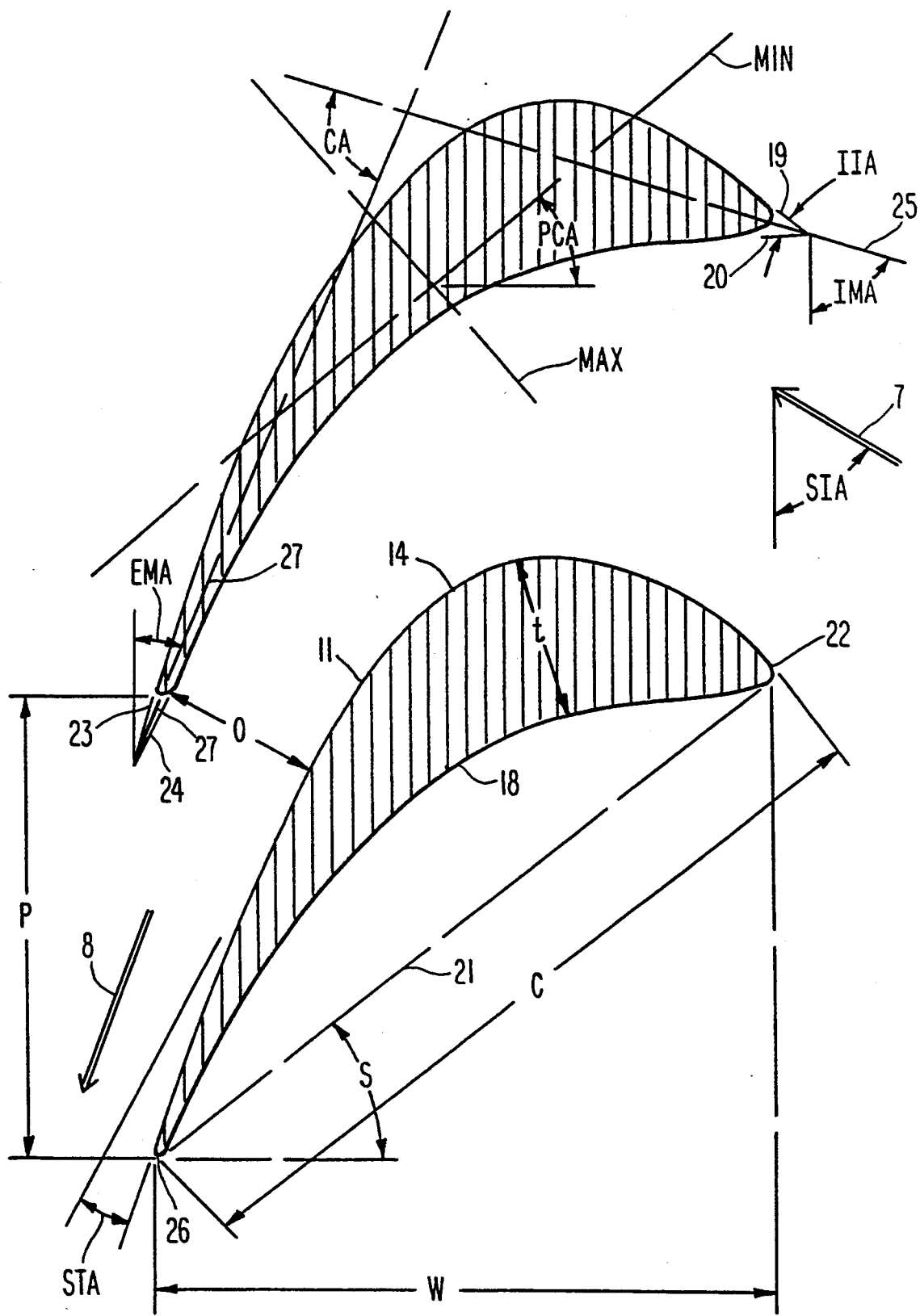
FIG. 2 is a schematic diagram of two adjacent, typical steam turbine blades illustrating various performance related parameters.

The parameters shown in Tables I and IA are defined as follows, with reference to FIG. 2. (It should be noted that FIG. 2 is a schematic diagram illustrating the various parameters described below on a steam turbine blade airfoil of generalized cross-section. Reference should be made to FIGS. 4 and 6 for an illustration of the airfoil shape of the blade of the current invention at various defined transverse sections.) The chord of the blade is the distance from the leading edge to the trailing edge and is indicated as C in FIG. 2. The width of the blade refers to the distance from the leading to the trailing edge in the axial direction—that is, the axial component of the chord—and is indicated by W in FIG. 2. The pitch is the distance in the tangential direction between the trailing edges of adjacent blades and is indicated in FIG. 2 as P. At any given diameter, the fewer the number of blades, the larger the pitch.

Figure 5:
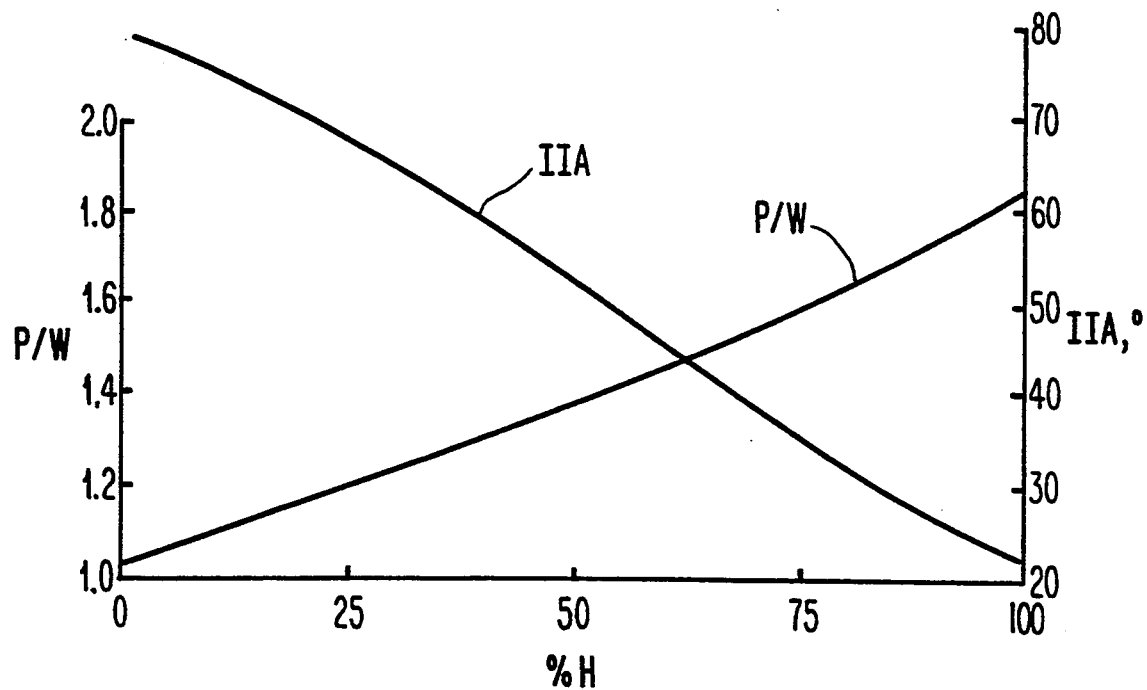
FIG. 5 is a graph showing the radial distribution of the inlet included angle IIA and pitch to width ratio P/W for the blade according to the current invention as a percentage of the airfoil height, from the base of the airfoil at 0% height to the tip of the airfoil at 100% height.

In order to reduce the centrifugal force on the rotor 3, the number of blades in the row has been reduced. As a result, the pitch to chord and pitch to width ratios have been increased over conventional blades. Thus, as shown in FIG. 5, the pitch to width ratio, P/W, exceeds 1.0 over the entire blade height. However, increasing the pitch makes it difficult to control the velocity distribution, thereby creating the potential for boundary layer separation as the steam expands toward the trailing edge portion 26 due to excessive deceleration.

The stagger angle is the angle that a line 21 drawn from the leading edge portion 22 to the trailing edge portion 26 makes with the axial direction and is indicated in FIG. 2 as S. As shown, the stagger angle was increased beyond conventional values in order to increase the pitch without losing control of steam velocity.

The maximum thickness of the airfoil is shown in FIG. 2 as t. The maximum thickness to chord ratio is the ratio of the maximum thickness of the airfoil transverse cross-section at the radial station to the chord length at that station. The quantity (1—(maximum thickness/pitch)) is defined as the blockage. The reduced thickness and high pitch of the blade according to the current invention results in relatively high blockage.

The camber angle is indicated as CA in FIG. 2 and is defined by the angle between the leading and trailing edge portions of the airfoil. Thus, the camber angle may be expressed as by the equation CA=180°−(IMA+EMA), where IMA and EMA are the inlet and exit metal angles, respectively. The inlet metal angle is defined below. The exit metal angle is the angle formed between the circumferential direction and the line 27 that bisects the lines 23 and 24, lines 23 and 24 being the lines that are tangent with the suction surface 14 and the pressure surface 18, respectively, at the trailing edge portion 26. The exit metal angle is indicated in FIG. 2 as EMA.

Figure 9:
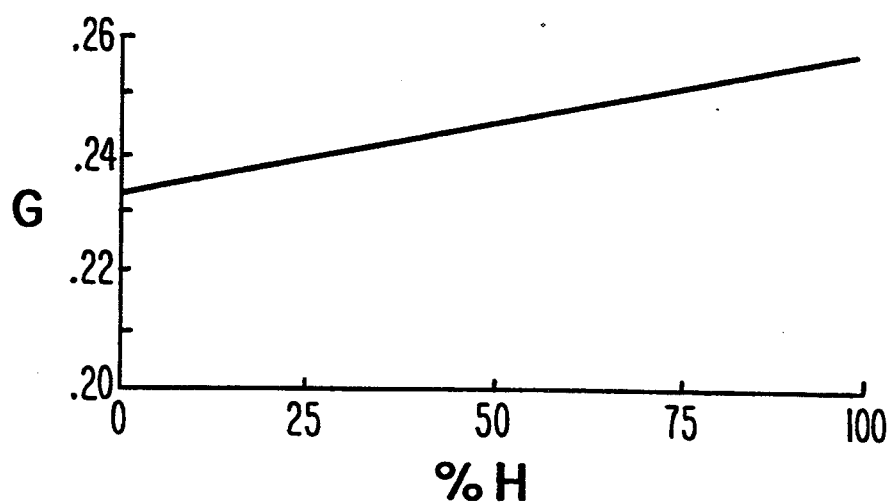
FIG. 9 is a graph showing the gauging of the blade according to the current invention as a percentage of the airfoil height, from the base of the airfoil at 0% height to the tip of the airfoil at 100% height.

The exit opening, or throat, is the shortest distance from the trailing edge portion 26 of one blade to the suction surface 14 of the adjacent blade and is indicated in FIG. 2 by O. The gauging of the blade row is defined as the ratio of the throat to the pitch and indicates the percentage of the annular area available for steam flow. The radial distribution of gauging of the blade of the current invention is shown in FIG. 9.

Figure 10:
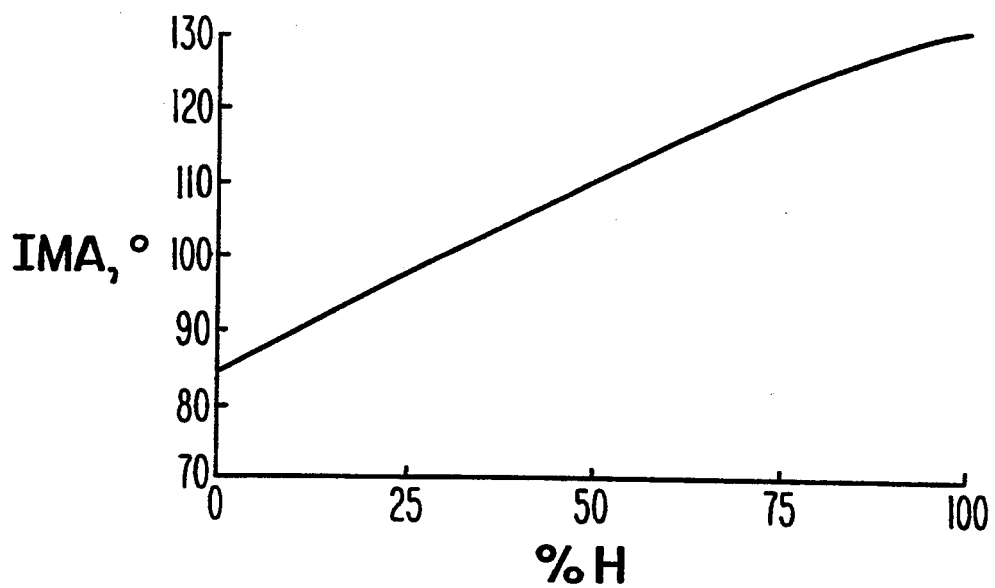
FIG. 10 is a graph showing the inlet metal angle of the blade according to the current invention as a percentage of the airfoil height, from the base of the airfoil at 0% height to the tip of the airfoil at 100% height.

The inlet metal angle is the angle formed between the circumferential direction and the line 25 that bisects the lines 19 and 20, lines 19 and 20 being the lines that are tangent with the suction surface 14 and the pressure surface 18, respectively, adjacent the leading edge portion 22. The inlet metal angle is indicated in FIG. 2 as IMA and shown as a function of airfoil height in FIG. 10. As can be seen, in the blade according to the current invention the inlet metal angle is unusually high, exceeding 80° at the base of the airfoil and increasing to over 130 at the tip.

The inlet included angle is the angle between the tangent lines 19 and 20 and is indicated in FIG. 2 as IIA. As discussed further below, the novel shape of the airfoil 11 of the current invention allows for a relatively large inlet included angle, especially in the mid-height region of the airfoil, as shown in FIG. 5. This large inlet included angle results in higher acceleration in the inlet portion of the passage between adjacent blades, thereby minimizing the potential for boundary layer separation which, as discussed below, is a source of energy loss.

The suction surface turning angle is the amount of the suction surface turning from the throat O to the trailing edge portion 26 and is indicated in FIG. 2 as STA. The optimum value for the suction surface turning angle depends on the Mach No. and is also a tradeoff since too large an amount of turning can cause flow separation and too little turning will prevent the steam flow from accelerating properly.

According to the current invention, the airfoil has a very small cross-sectional area in order to reduce its mass and, therefore, the centrifugal force imposed on the blade root 12 and rotor groove 37 as a result of the weight of the airfoil. However, other things being equal, reducing the cross-sectional area of the airfoil reduces its bending strength. According to the current invention, this problem was solved by utilizing a relatively high camber angle, as shown in Tables I and IA, to provide the necessary bending stiffness, as well as a switch in curvature in the pressure surface 18 near the leading edge portion 22.

A detailed view of the shape of the airfoil of the current invention at the mid-height location is shown in FIG. 6. In addition, Tables II and III show the values of the curvature of the suction and pressure surfaces 14 and 18, respectively, at eleven locations, shown in FIG. 6, spaced along these surfaces and at five radial locations. (The curvature values for the base and tip cross-sections shown in Tables II and III are based on the extrapolated cross-sections, as previously discussed.)

As used herein, curvature K is defined as the inverse of the radius of curvature R of the surface contour. The radius of curvature is defined as the distance from the surface to the center of curvature, the center of curvature being defined as the intersection of two lines normal to the surface as the points of intersection of the two normal lines with the surface are made to approach one another.

TABLE II

| | Suction Surface Curvature, $mm^{-1}$ ($\times 10^{-2}$) | | | | |
|---|---|---|---|---|---|
| Location | Base Section | 25% Section | 50% Section | 75% Section | Tip Section |
| 0% | 0.3 | 0.2 | 0.2 | 0.2 | 0.3 |
| 10% | 0.3 | 0.2 | 0.2 | 0.2 | 0.3 |
| 20% | 0.2 | 0.3 | 0.2 | 0.2 | 0.3 |
| 30% | 0.3 | 0.3 | 0.3 | 0.3 | 0.3 |
| 40% | 0.7 | 0.3 | 0.3 | 0.3 | 0.4 |
| 50% | 1.0 | 1.2 | 1.1 | 0.9 | 0.5 |
| 60% | 2.3 | 1.9 | 1.7 | 1.1 | 1.5 |
| 70% | 5.8 | 4.5 | 4.1 | 4.4 | 2.7 |
| 80% | 7.1 | 6.9 | 6.0 | 4.9 | 4.1 |
| 90% | 6.5 | 7.1 | 5.9 | 3.9 | 3.6 |
| 100% | 1.5 | 1.7 | 2.2 | 1.2 | 0.8 |

TABLE III

| | Pressure Surface Curvature, $mm^{-1}$ ($\times 10^{-2}$) | | | | |
|---|---|---|---|---|---|
| Location | Base section | 25% Section | 50% Section | 75% Section | Tip Section |
| 0% | 1.0 | 0.4 | 0.5 | 0.2 | 0.2 |
| 10% | 1.0 | 0.3 | 0.5 | 0.2 | 0.2 |
| 20% | 1.2 | 0.8 | 0.7 | 0.5 | 0.4 |
| 30% | 1.3 | 1.3 | 0.9 | 0.7 | 0.5 |
| 40% | 1.4 | 1.7 | 1.1 | 1.1 | 0.6 |
| 50% | 1.6 | 1.6 | 1.4 | 1.2 | 0.9 |
| 60% | 1.7 | 1.4 | 1.6 | 1.4 | 1.1 |
| 70% | 1.9 | 1.8 | 1.6 | 1.3 | 1.4 |
| 80% | 1.0 | 2.0 | 1.4 | 1.1 | 1.0 |
| 90% | −0.3 | −1.1 | −1.0 | −0.3 | 0.5 |
| 100% | −0.9 | −2.6 | −2.5 | −1.3 | 0.0 |

The 0% locations shown in Tables II and III are adjacent to, in the upstream direction, the trailing edge portion 26 and are taken as the points of intersection 40 and 40' between the radius that forms the trailing edge portion and pressure and suction surfaces 18 and 14, respectively, as shown in FIG. 6. The 100% locations are adjacent to, in the downstream direction, the leading edge portion 22 and are taken as the points of intersection 42 and 42' between the radius that forms the leading edge portion and pressure and suction surfaces 18 and 14, respectively. The remaining points are spaced evenly between points 40/40' and 42/42'. The locations 10%, 20%, etc., refer to the distance from that location to the 40/40' point (depending on whether the suction or pressure surface is being referred to) measured along the surface of the transverse section at the particular height (i.e., base, 25%, etc.), expressed as the percentage of the distance between the 40 and 42 points or between the 40' and 42' points (again depending on whether the suction of pressure surface is being referred to) as measured along the surface of the transverse section at that height.

Figure 7:
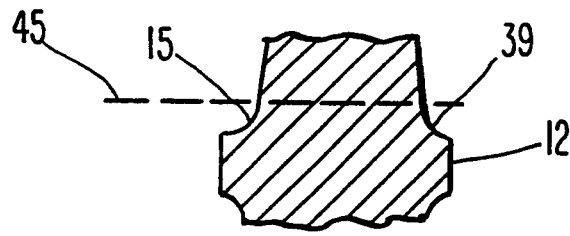
FIG. 7 is a graph showing the curvature K, in $mm^{-1} \times 10^{-2}$, of the pressure surface of the airfoil of current invention from a point adjacent the trailing edge portion TE, indicated by reference numeral 40 in FIG. 4, to a point adjacent the leading edge portion LE, indicated by reference numeral 42 in FIG. 4, as a percent of the distance along the pressure surface between these two points at the three radial locations, the base B, the 50% height section, and the tip T.
Figure 7:
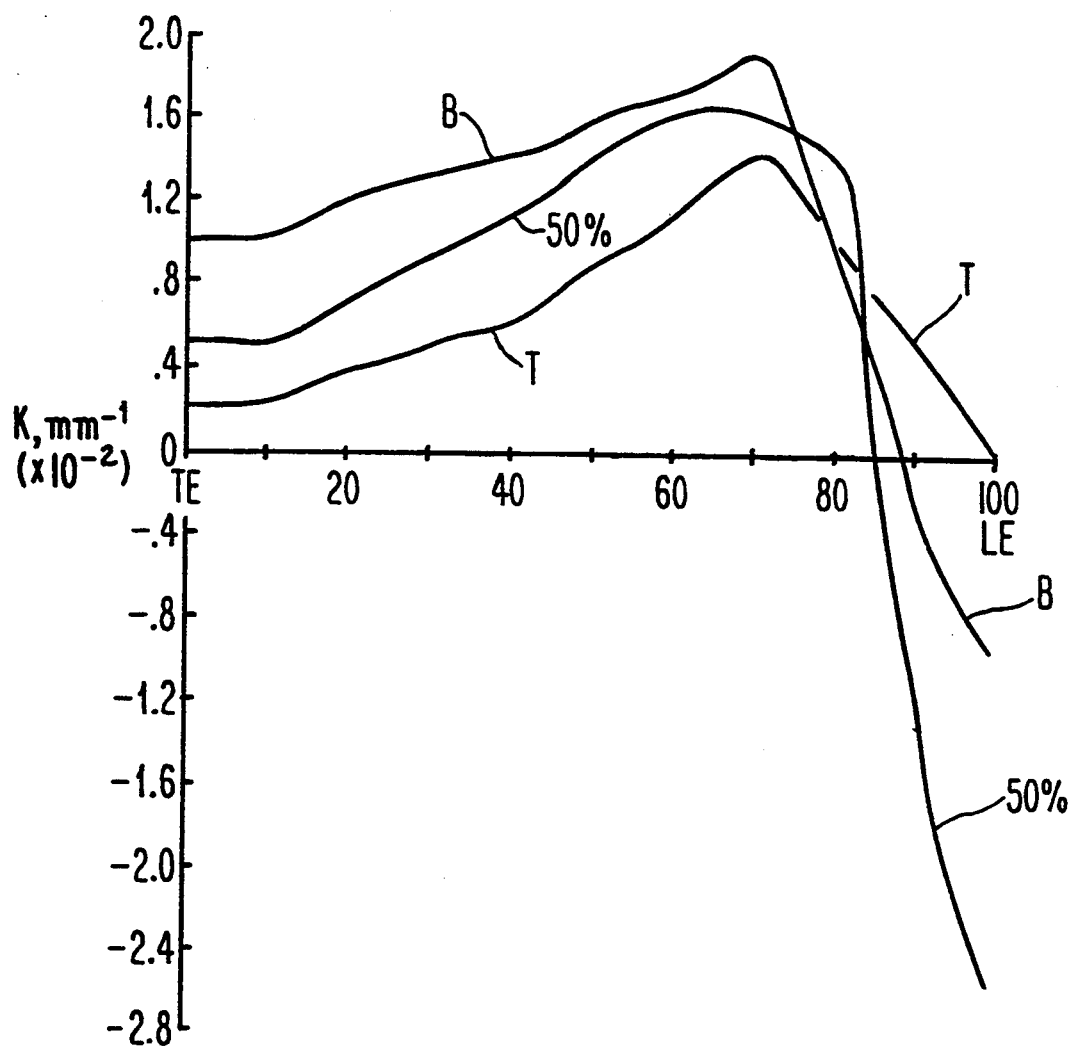

As shown in Table III and FIG. 6, and graphically in FIG. 7, according to the current invention, the curvature of the pressure surface 18 has a point of inflection between the portion 47 of the pressure surface 18 adjacent the leading edge portion 22 and the downstream adjacent portion 44. At this point of inflection, the radius of curvature of the airfoil 11 switches sign from positive to negative. (As used herein the sign convention is arbitrarily chosen to indicate whether, from a given reference point, the curvature is concave (negative) or convex (positive).) This curvature change is most pronounced in the central portion of the airfoil height—i.e., from a height of approximately 25% of the airfoil height to a height of approximately 75%. Referring to FIGS. 6 and 7, it can be seen that at mid-height the portion of the pressure surface 18 approximately 50-80% upstream from the trailing edge portion 26 has a curvature K in excess of +0.012 $mm^{-1}$, indicated by the radius of curvature R2 from center of curvature C2. However, the curvature of the immediately upstream portion 47 that extends to point 42 has a negative curvature that reaches −0.025 $mm^{-1}$, indicated by the radius of curvature R1 from center of curvature C1. The point of inflection occurs approximately 85% upstream of the trailing edge portion 26, as shown in FIGS. 6 and 7. Thus, the pressure surface 18 forms a generally convex surface except in portion 47 wherein it forms a concave surface.

As shown in Table III and FIG. 7, the reverse curvature—i.e., the degree of concavity of the curvature—of the pressure surface 18 is at a maximum in approximately 25% to 50% height region. However, the reverse curvature tapers out completely as the airfoil extends radially outward toward the tip 16 and also reduces considerably as the airfoil extends inward toward the base 15. This shaping is done because although the higher acceleration that results from the high inlet included angle accompanying reverse curvature is desirable in the middle portion of the blade height, as previously discussed, it is desirable to avoid such acceleration near the tip and the base since it would tend to promote secondary flows and their attendant losses.

The use of the reverse curvature in the portion 47 of the airfoil 11 results in an unusual high inlet included angle IIA, defined in FIG. 2. As shown in Table I and IA and plotted in FIG. 5, the inlet included angle exceeds 25° almost over the entire radial height of the airfoil 11 and is over 50° in the lower half of the airfoil height. As a result, the airfoil 11 is especially thick adjacent its leading edge portion 22, thereby making it possible to considerably thin down the portion of the airfoil downstream of the reverse curvature portion 47.

Figure 8:
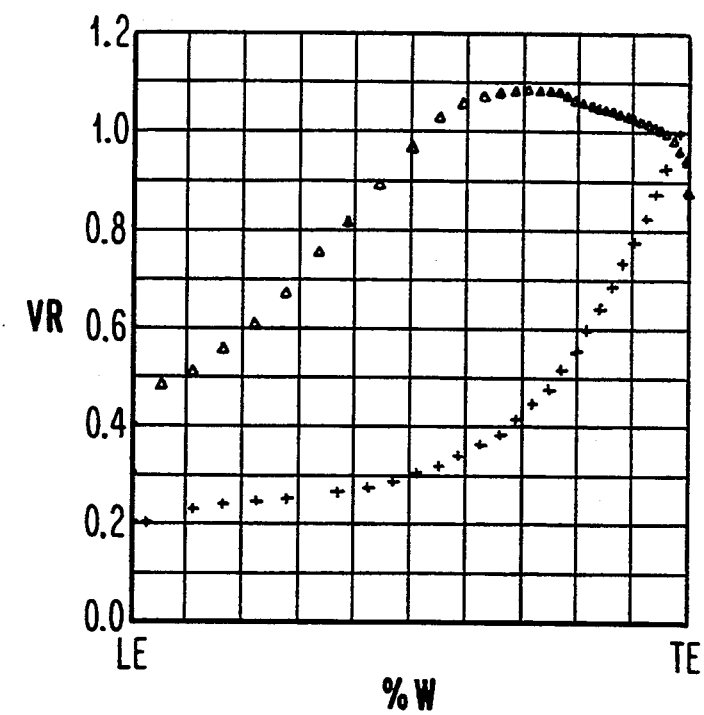
FIGS. 8 is graph showing the calculated axial distribution of the steam velocity ratio VR—that is, the local surface velocity to the blade row exit velocity—along the width W of the airfoil, from the leading edge portion LE to the trailing edge portion TE, over the blade suction surface, indicated by the triangles, and the blade pressure surface, indicated by the crosses, at the mid-height location.

The novel shape of the blade airfoil 11 according to the current invention, as specified in Tables I–III and illustrated in FIGS. 4–7, allows the steam 7 to expand across the blade row with a minimum amount of energy loss. Major sources of loss in the blade row are surface friction and separation of the boundary layer on the suction surface of the blade. Thus, in the blade according to the current invention, friction losses are minimized by configuring the airfoil shape so as to maintain the velocity of the steam at relatively low values, as shown in FIG. 8. Specifically, FIG. 8 shows that the velocity ratio—that is, the ratio of the steam velocity along the surface of the airfoil at a given radial station to the velocity of the steam exiting the blade row at that radial station—on both the suction surface 14 and the pressure surface 18, indicated by the triangles and crosses, respectively, along the entire width of the airfoil is less than 1.2. Such advantageous velocity profiles are made possible by the blade surface contour.

In addition, FIG. 8 also shows that in the blade according to the current invention, separation of the boundary layer is prevented by configuring the airfoil geometry to ensure that the steam does not decelerate too rapidly as it expands toward the trailing edge portion of the airfoil, note the gradual decline in the velocity ration at the suction surface downstream of 80% of the blade width.

The mechanical properties of the blade are shown in Table IV (the base and tip sections are the extrapolated sections, as previously discussed). The principal coordinate axes of the airfoil are indicated in FIG. 2 as MIN and MAX. The minimum and maximum second moments of inertia about these axes are shown in Table II as by $I_{min}$ and $I_{max}$, respectively. The radial distribution of $I_{min}$ and the cross-sectional area have a strong influence on the first vibratory mode. The radial distribution of $I_{max}$ and the cross-sectional area have a strong influence on the second vibratory mode. Hence, it is important that these values be adjusted so as to avoid resonance. The distances of the leading and trailing edges from the principal coordinate axes are designed by C. The angle the principal coordinate axis MIN makes with the axial direction is indicated in FIG. 2 as PCA.

Also, in the airfoil according to the current invention, the centroid at all of the transverse sections is approximately above the centroid of the root in order to minimize eccentric stresses. However, preferably the airfoil centroids are shifted slightly from the root centroid in order to offset bending due to steam forces.

TABLE IV

| | Airfoil Mechanical Parameters | | | | |
|---|---|---|---|---|---|
| Percent Height | Base | 25% | 50% | 75% | Tip |
| Angle of Principal Coordinate Axes | 52 | 55 | 58 | 62 | 65 |
| Cross-sectional Area, mm$^2$ | 650 | 463 | 355 | 265 | 191 |
| $I_{tor}$ (mm$^4$ × 10$^3$) | 35.0 | 14.8 | 7.0 | 3.0 | 1.1 |
| $I_{min}$ (mm$^4$ × 10$^3$) | 14.9 | 6.7 | 3.2 | 1.5 | 0.6 |
| $I_{max}$ (mm$^4$ × 10$^3$) | 131 | 87 | 65 | 48 | 37 |
| $C_{min}$ LE (mm) | −11.9 | −9.3 | −7.4 | −5.9 | −4.8 |
| $C_{max}$ LE (mm) | 20.9 | 20.8 | 21.3 | 21.8 | 22.3 |
| $C_{min}$ TE (mm) | −8.9 | −8.0 | −6.5 | −5.3 | −4.1 |
| $C_{max}$ TE (mm) | −44 | −42 | −39 | −38 | −37 |

The present invention may be embodied in other specific forms without departing from the spirit or essential attributes thereof and, accordingly, reference should be made to the appended claims, rather than to the foregoing specification, as indicating the scope of the invention.

We claim:

1. A steam turbine comprising a stationary cylinder for containing a steam flow, and a rotor enclosed by the cylinder, and a row of blades, each of said blades having a root portion attached to said rotor and an airfoil portion, each of said airfoil portions having:
    a) a base portion and a tip portion defining an airfoil height therebetween;
    b) a rounded leading edge portion and a trailing edge portion;
    c) a pressure surface and a generally concave suction surface extending between said rounded leading edge portion and said trailing edge portion and defining a thickness of said airfoil therebetween, (i) each of said airfoils having first, second and third transverse sections disposed radially outward from said root by distances equal to approximately 25%, 50% and 75%, respectively, of said height of said airfoil, a first portion of said airfoil height extending between said first and third sections, and (ii) said pressure surface over at least said first portion of said airfoil height having a curvature undergoing an inflection at a location disposed within said pressure surface, a first portion of said pressure surface extending over said first portion of said airfoil height having a concave curvature and being disposed between said inflection location and said rounded leading edge portion, a second portion of said pressure surface extending over said first portion of said airfoil height having a convex curvature and being disposed between said inflection location and said trailing edge, said concave curvature in said first portion of said pressure surface having a maximum negative value greater than $-1.0$ mm$^{-1} \times 10^{-2}$, and said convex curvature in said second portion of said pressure surface having a maximum positive value greater than 1.0 mm$^{-1} \times 10^{-2}$.

2. A steam turbine comprising a stationary cylinder for containing a steam flow, and a rotor enclosed by the cylinder, and a row of blades, each of said blades having a root portion attached to said rotor and an airfoil portion, each of said airfoil portions having:
    a) a base portion and a tip portion defining an airfoil height therebetween;
    b) a leading edge portion and a trailing edge portion;
    c) pressure and suction surfaces extending between said leading edge and trailing edge portions and defining a thickness of said airfoil therebetween, (i) each of said airfoils having first, second and third transverse sections disposed radially outward from said root by distances equal to approximately 25%, 50% and 75%, respectively, of said height of said airfoil, a first portion of said airfoil height extending between said first and third sections, and (ii) said pressure surface over at least said first portion of said airfoil height having a curvature undergoing an inflection at a location thereon, a first portion of said pressure surface disposed upstream of said inflection location and a second portion of said pressure surface disposed downstream of said inflection location, said pressure surface having a concave curvature in said first portion and a convex curvature in said second portion; and
    d) each of said airfoils being defined by the following parameters having approximately the values indicated below, all angles being expressed in degrees:

| Percent Height | 25% Section | 50% Section | 75% Section |
| --- | --- | --- | --- |
| Radius (cm) | 85.2 | 87.8 | 90.4 |
| Width (cm) | 3.6 | 3.2 | 2.9 |
| Pitch/Width Ratio | 1.20 | 1.39 | 1.59 |
| Pitch/Cord Ratio | 0.69 | 0.73 | 0.76 |
| Stagger Angle | 53.8 | 57.7 | 61.1 |
| Maximum Thickness (mm) | 13.6 | 10.4 | 7.8 |
| Max Thickness/Cord | 0.22 | 0.17 | 0.13 |
| Camber Angle | 67.9 | 53.7 | 42.4 |
| Exit Opening (mm) | 10.1 | 10.7 | 11.3 |
| Inlet Metal Angle | 97.9 | 112.4 | 123.8 |
| Inlet Included Angle | 67.3 | 52.1 | 33.8 |
| Suction Surface Turning Angle | 11.2 | 13.3 | 14.9 |

3. A steam turbine comprising a stationary cylinder for containing a steam flow, and a rotor enclosed by the cylinder, and a row of blades, each of said blades having a root portion attached to said rotor and an airfoil portion, each of said airfoil portions having:
   a) a base portion and a tip portion defining an airfoil height therebetween;
   b) a leading edge portion and a trailing edge portion;
   c) pressure and suction surfaces extending between said leading edge and trailing edge portions and defining a thickness of said airfoil therebetween, (i) each of said airfoils having first, second and third transverse sections disposed radially outward from said root by distances equal to approximately 25%, 50% and 75%, respectively, of said height of said airfoil, a first portion of said airfoil height extending between said first and third sections, and (ii) said pressure surface over at least said first portion of said airfoil height having a curvature undergoing an inflection at a location thereon, a first portion of said pressure surface disposed upstream of said inflection location and a second portion of said pressure surface disposed downstream of said inflection location, said pressure surface having a concave curvature in said first portion and a convex curvature in said second portion, said pressure surface having a curvature at said first, second and third transverse sections as follows, the locations 0% through 100% referring to distances by which each respective location is displaced from said trailing edge portion along said pressure surface expressed as a percentage of the total distance along said pressure surface from said trailing edge portion to said leading edge portion:

| Pressure Surface Curvature, mm$^{-1}$ ($\times 10^{-2}$) | | | |
| --- | --- | --- | --- |
| Location | 25% Section | 50% Section | 75% Section |
| 0% | 0.4 | 0.5 | 0.2 |
| 10% | 0.3 | 0.5 | 0.2 |
| 20% | 0.8 | 0.7 | 0.5 |
| 30% | 1.3 | 0.9 | 0.7 |
| 40% | 1.7 | 1.1 | 1.1 |
| 50% | 1.6 | 1.4 | 1.2 |
| 60% | 1.4 | 1.6 | 1.4 |
| 70% | 1.8 | 1.6 | 1.3 |
| 80% | 2.0 | 1.4 | 1.1 |
| 90% | −1.1 | −1.0 | −0.3 |
| 100% | −2.6 | −2.5 | −1.3 |

4. The steam turbine according to claim 3, wherein said suction surface has a curvature at said first, second and third transverse sections as follows, the locations 0% through 100% referring to distances by which each respective location is displaced from said trailing edge portion along said suction surface expressed as a percentage of the total distance along said suction surface from said trailing edge portion to said leading edge portion:

| Suction Surface Curvature, mm$^{-1}$ ($\times 10^{-2}$) | | | |
| --- | --- | --- | --- |
| Location | 25% Section | 50% Section | 75% Section |
| 0% | 0.2 | 0.2 | 0.2 |
| 10% | 0.2 | 0.2 | 0.2 |
| 20% | 0.3 | 0.2 | 0.2 |
| 30% | 0.3 | 0.3 | 0.3 |
| 40% | 0.3 | 0.3 | 0.3 |
| 50% | 1.2 | 1.1 | 0.9 |
| 60% | 1.9 | 1.7 | 1.1 |
| 70% | 4.5 | 4.1 | 4.4 |
| 80% | 6.9 | 6.0 | 4.9 |
| 90% | 7.1 | 5.9 | 3.9 |
| 100% | 1.7 | 2.2 | 1.2 |

5. In a steam turbine, a row of blades comprising an airfoil for each blade, each of said airfoils (i) having a base portion and a tip portion defining an airfoil height therebetween, (ii) having transverse sections disposed radially outward from said base by distances equal to 25%, 50% and 75%, respectively, of said height of said airfoil, and (iii) defined by the following parameters having approximately the values indicated below, all angles being expressed in degrees:

| Percent Height | 25% Section | 50% Section | 75% Section |
| --- | --- | --- | --- |
| Width (cm) | 3.6 | 3.2 | 2.9 |
| Pitch/Width Ratio | 1.20 | 1.39 | 1.59 |
| Pitch/Cord Ratio | 0.69 | 0.73 | 0.76 |
| Stagger Angle | 53.8 | 57.7 | 61.1 |
| Maximum Thickness (mm) | 13.6 | 10.4 | 7.8 |
| Max Thickness/Cord | 0.22 | 0.17 | 0.13 |
| Camber Angle | 67.9 | 53.7 | 42.4 |
| Exit Opening (mm) | 10.1 | 10.7 | 11.3 |
| Inlet Metal Angle | 97.9 | 112.4 | 123.8 |
| Inlet Included Angle | 67.3 | 52.1 | 33.8 |
| Suction Surface Turning Angle | 11.2 | 13.3 | 14.9 |

6. In a steam turbine, a row of blades, each of said blades having a root portion and an airfoil portion, each of said airfoil portions having (i) a base portion and a tip portion defining an airfoil height therebetween, (ii) a leading edge portion and a trailing edge portion, (iii) pressure and suction surfaces extending between said leading edge and trailing edge portions and defining a thickness of said airfoil therebetween, (iv) transverse sections disposed radially outward from said root by distances equal to 25%, 50% and 75%, respectively, of said height of said airfoil, said pressure surface having a curvature at said base and tip portions and at said 25%, 50% and 75% sections as follows, the locations 0% through 100% referring to distances by which each respective location is displaced from said trailing edge portion along said pressure surface expressed as a percentage of the total distance along said pressure surface from said trailing edge portion to said leading edge portion:

| Pressure Surface Curvature, $mm^{-1}$ ($\times 10^{-2}$) | | | | | |
| --- | --- | --- | --- | --- | --- |
| Location | Base Section | 25% Section | 50% Section | 75% Section | Tip Section |
| 0% | 1.0 | 0.4 | 0.5 | 0.2 | 0.2 |
| 10% | 1.0 | 0.3 | 0.5 | 0.2 | 0.2 |
| 20% | 1.2 | 0.8 | 0.7 | 0.5 | 0.4 |
| 30% | 1.3 | 1.3 | 0.9 | 0.7 | 0.5 |
| 40% | 1.4 | 1.7 | 1.1 | 1.1 | 0.6 |
| 50% | 1.6 | 1.6 | 1.4 | 1.2 | 0.9 |
| 60% | 1.7 | 1.4 | 1.6 | 1.4 | 1.1 |
| 70% | 1.9 | 1.8 | 1.6 | 1.3 | 1.4 |
| 80% | 1.0 | 2.0 | 1.4 | 1.1 | 1.0 |
| 90% | −0.3 | −1.1 | −1.0 | −0.3 | 0.5 |
| 100% | −0.9 | −2.6 | −2.5 | −1.3 | 0.0 |

7. The row of blades according to claim 6, wherein said suction surface has a curvature at said base and tip portions and at said 25%, 50% and 75% sections as follows, the locations 0% through 100% referring to distances by which each respective location is displaced from said trailing edge portion along said suction surface expressed as a percentage of the total distance along said suction surface from said trailing edge portion to said leading edge portion:

| Suction Surface Curvature, $mm^{-1}$ ($\times 10^{-2}$) | | | | | |
| --- | --- | --- | --- | --- | --- |
| Location | Base Section | 25% Section | 50% Section | 75% Section | Tip Section |
| 0% | 0.3 | 0.2 | 0.2 | 0.2 | 0.3 |
| 10% | 0.3 | 0.2 | 0.2 | 0.2 | 0.3 |
| 20% | 0.2 | 0.3 | 0.2 | 0.2 | 0.3 |
| 30% | 0.3 | 0.3 | 0.3 | 0.3 | 0.3 |
| 40% | 0.7 | 0.3 | 0.3 | 0.3 | 0.4 |
| 50% | 1.0 | 1.2 | 1.1 | 0.9 | 0.5 |
| 60% | 2.3 | 1.9 | 1.7 | 1.1 | 1.5 |
| 70% | 5.8 | 4.5 | 4.1 | 4.4 | 2.7 |
| 80% | 7.1 | 6.9 | 6.0 | 4.9 | 4.1 |
| 90% | 6.5 | 7.1 | 5.9 | 3.9 | 3.6 |
| 100% | 1.5 | 1.7 | 2.2 | 1.2 | 0.8 |

* * * * *